US008683389B1

(12) United States Patent
Bar-Yam et al.

(10) Patent No.: US 8,683,389 B1
(45) Date of Patent: Mar. 25, 2014

(54) METHOD AND APPARATUS FOR DYNAMIC INFORMATION VISUALIZATION

(75) Inventors: Yaneer Bar-Yam, Newton, MA (US); Dion Harmon, New York, NY (US); Kawandeep Virdee, Somerville, MA (US); Vedant Misra, Southington, CT (US); Marco Lagi, Cambridge, MA (US)

(73) Assignee: The New England Complex Systems Institute, Inc., Cambridge, MA (US)

( * ) Notice: Subject to any disclaimer, the term of this patent is extended or adjusted under 35 U.S.C. 154(b) by 62 days.

(21) Appl. No.: 12/877,697

(22) Filed: Sep. 8, 2010

(51) Int. Cl.
*G06F 3/048* (2013.01)

(52) U.S. Cl.
USPC .......... 715/853; 715/712; 715/713; 715/822; 709/737; 709/798

(58) Field of Classification Search
USPC ................. 715/853, 712, 713; 707/737, 798
See application file for complete search history.

(56) References Cited

U.S. PATENT DOCUMENTS

| | | | | |
|---|---|---|---|---|
| 6,065,012 | A * | 5/2000 | Balsara et al. ..................... 1/1 |
| 6,067,093 | A * | 5/2000 | Grau et al. ..................... 345/440 |
| 6,829,615 | B2 * | 12/2004 | Goodwin et al. ..................... 1/1 |
| 2004/0181554 | A1 * | 9/2004 | Heckerman et al. ........ 707/104.1 |
| 2004/0210558 | A1 * | 10/2004 | Endo et al. ..................... 707/1 |
| 2005/0086238 | A1 * | 4/2005 | Nevin, III ..................... 707/100 |
| 2005/0278321 | A1 * | 12/2005 | Vailaya et al. ..................... 707/3 |
| 2006/0106847 | A1 * | 5/2006 | Eckardt et al. ................. 707/101 |
| 2006/0122884 | A1 * | 6/2006 | Graham et al. ................. 705/14 |
| 2007/0208719 | A1 * | 9/2007 | Tran ................................. 707/3 |
| 2007/0288442 | A1 * | 12/2007 | Iwayama et al. ................... 707/3 |
| 2008/0263022 | A1 * | 10/2008 | Kostorizos et al. ............... 707/5 |
| 2009/0070325 | A1 * | 3/2009 | Gabriel et al. ..................... 707/5 |
| 2009/0083261 | A1 * | 3/2009 | Nagano et al. ..................... 707/5 |
| 2009/0115785 | A1 * | 5/2009 | Grandhi et al. ............... 345/440 |
| 2010/0106752 | A1 * | 4/2010 | Eckardt et al. ................. 707/805 |
| 2010/0153324 | A1 * | 6/2010 | Downs et al. ..................... 706/21 |
| 2010/0228693 | A1 * | 9/2010 | Dawson et al. .................. 706/12 |
| 2011/0037766 | A1 * | 2/2011 | Judy et al. ..................... 345/440 |
| 2012/0005239 | A1 * | 1/2012 | Nevin, III ..................... 707/798 |

OTHER PUBLICATIONS

Noel et al.; Visualizing Association Mining Results through Hierarchical Clusters; © 2001; IEEE; pp. 425-433.*
Noel et al.; Visualization of Document Co-Citation Counts; © 2002; IEEE; pp. 1-6.*
Mukherjea et al.; Visualizing World-WideWeb Search Engine Results; © 1999; IEEE; pp. 400-405.*
Flowler et al.; Visualizing and Browsing WWW Semantic Content'; © 1996; IEEE; pp. 110-113.*
Gershon et al; Case Study Visualizing Internet resources; ©1995; IEEE; pp. 122-128.*
Gershon et al; Case Study Visualizing Internet resources; © 1995; IEEE; pp. 122-128.*

* cited by examiner

*Primary Examiner* — Linh K Pham
(74) *Attorney, Agent, or Firm* — Chapin IP Law, LLC

(57) ABSTRACT

A method for organizing, visualizing, and navigating data objects within a dataset is presented, including network visualization alongside a detailed information display. The method includes interactivity with the visualization through network panning, zooming, and node clicking. The network nodes represent the data objects. Node proximity and links represent similarity or other relatedness measures between respective data objects. The network can be displayed in full to illustrate large scale properties. Clicking the nodes provides further data object information of the highlighted node, which is displayed alongside the network.

28 Claims, 11 Drawing Sheets

Pattern Detection in Human Terrain Systems Data

| | Document Title |
|---|---|
| 1 | Ethnologue Report: Brahui Language |
| 2 | National Profile of Internally Displaced Persons (IDPs) in Afghanistan (11 sections)  |
| 3 | Afghanistan in Perspective |
| 4 | Ethnologue Report: Shughni Language |
| 5 | Ethnologue Report: Sanglechi-Ishkashimi Language |
| 6 | Post-War Governance, Security, and U.S. Policy (13 sections) |
| 7 | Ethnologue Report: Turkmen Language |
| 8 | A Case of Apostasy |
| 9 | Ethnologue Report: Darwazi Language |
| 10 | The Dari Writing System |
| 11 | UCLA Language Profile: Brahui |
| 12 | Socio-Economic Impacts of Climate Change in Afghanistan (3 sections) |
| 13 | International Women's Day Celebrated with Self-Immolation |
| 14 | The Afghan Nexus |
| 15 | Representations of Gender and Islam (3 sections) |
| 16 | Applied Social Science Research in Afghanistan (5 sections) |

*FIG. 2*

```
Ethnologue report for language code:wbk

Waigali
A language of Afghanistan
ISO 639-3: wbk
    Population1,500 (2000 Van Driem).
    RegionSoutheast Nuristan, north of Pech in central Kunar Province. Varjan
    is in north Waigal Valley, villages of Waigal, Zonchigal, Jamach,
    Ameshdesh, and eastward in the Veligai Valley and villages there.
    Chima-Nishey is in villages in the lower valley.
    Alternate names Waigeli, Waigalii, Waigala, Zhonjigali, Suki, Wai-Ala,
    Wai, Kalasha-Ala
    DialectsVarjan, Chima-Nishey. Lexical similarity 76% to 80% with Tregami.
    ClassificationIndo-European, Indo-Iranian, Indo-Aryan, Nuristani
    Language developmentLiteracy rate in first language: below 1%. Literacy
    rate in second language: 15% to 25%.
    CommentsMuslim.

Gordon, Raymond G., Jr. (ed.), 2005. Ethnologue: Languages of the World,

URL: http://www.ethnologue.com/show_language.asp?code=wbk
```

610
ORGANIZING THE PLURALITY OF DATA OBJECTS

710
CONSTRUCTING FEATURE VECTORS FROM THE PLURALITY OF DATA OBJECTS

712
DATA OBJECTS CAN BE SPLIT TO ANY SCALE OF SUB OBJECTS FOR WHICH FEATURE VECTORS ARE CREATED, AND THAT SCALE REFERS TO THE SIZE OF THE COMPONENTS OF THE DATA OBJECTS

714
METRIC AND FEATURES VECTORS ARE DETERMINED FROM CROWD SOURCED DATA WHERE CROWD SOURCED DATA REFERS TO INFORMATION OBTAINED FROM GROUPS OF INDIVIDUALS TO BE ANALYZED FOR PURPOSES OF CREATING THE NETWORK

720
CREATING A PROXIMITY METRIC FROM THE FEATURE VECTORS

730
IDENTIFYING LINKS BETWEEN THE DATA OBJECTS BY PROJECTING THE DATA BASE AND PROXIMITIES ONTO A NETWORK

740
MAPPING DATA OBJECTS ONTO A LOWER DIMENSIONAL SHAPE USING MULTIVARIATE STATISTICAL TECHNIQUES SUCH THAT SIMILAR OBJECTS ARE IN CLOSER PROXIMITY THAN DISSIMILAR OBJECTS

750
DISPLAYING A PLURALITY OF LINKS CONNECTING PAIRS OF THE INTERACTIVE MARKERS, EACH LINK INDICATING THE ORGANIZATION OF THE PLURALITY OF DATA OBJECTS AND RELATIONSHIPS BETWEEN PAIRS OF THE PLURALITY OF DATA OBJECTS

752
DISPLAYING LINKS AS A FUNCTION OF A PREDETERMINED THRESHOLD OF AN ORGANIZATIONAL METRIC

*FIG. 11*

METHOD AND APPARATUS FOR DYNAMIC INFORMATION VISUALIZATION

BACKGROUND

Information organization and visualization is essential for efficient data search, exploration and discovery, especially for large data sets. It is sometimes difficult to organize large amounts of information in a useful way. The way in which data is interpreted and converted into meaning relationships is affected by the way in which it is presented. A well designed information retrieval process can enhance comprehension, communication, hypothesis formation, and reduce search times. A useful technique to display the relationships in large data sets is through interactive visual exploration of data.

In recent years networks have been used to analyze and visualize data of many types of elements and their relationships, including social connections of friends, family and contacts, internet social groups, correlated stock prices in finance, gene interactions, genotypic and phenotypic relationships, food webs, transportation routes, sexual interactions, genealogical trees, hyperlinked documents within Wikipedia, academic papers related by common citation, academic papers related by co-authors, semantic web, actor co-occurrence within movies, metabolic pathways, disease spread, countries related by product exports, internet web pages related by links, neuronal interactions, social communications by e-mails, text messages, mobile phone calls, virus spread, human mobility, protein interactions, institutional organization, military organization, functional organization with biological cells, communication infrastructure, and product construction processes.

To facilitate the detection of larger scale patterns in a set of data, methods for information visualization have previously been developed. Many of these visualizations have been manually designed, although there are also automated visualizations which make use of software applications. Example applications include applications for organizing and searching through a document base of patent documents focus primarily on identifying similarities between patent documents but do not incorporate an interactive network visualization model.

There is a need to see detail and the larger context of data sets at the same time. In particular, there are no applications that enable a simultaneous broad view of the network and detailed understanding of a data set element or relationship in order to visualize data elements in context. Conventional applications plot information on a network, without simultaneous display of details that can be explored with respect to individual data elements. Alternatively, applications that involve information navigation on a network focus on navigation from node to node in a local context of nearby neighbors without having the ability to see a global portion of the network.

SUMMARY

Conventional mechanisms such as those explained above suffer from a variety of deficiencies. One such deficiency is that they do not provide the ability to see a global portion of the network while at the same time displaying details that can be explored concerning an individual data element.

Embodiments of the invention significantly overcome such deficiencies and provide mechanisms and techniques for organizing and displaying a plurality of data objects on a display screen including organizing the plurality of data objects according to at least one relatedness measure between respective pairs of the plurality of data objects, displaying on a first portion of the display screen the plurality of data objects as a network display, the network display including interactive markers corresponding to the plurality of data objects and displaying on the first portion of the display screen an indication of the source of a selected data object in response to querying a corresponding interactive marker. The techniques further include highlighting a subset of the plurality of data objects in response to a first selection of an interactive marker representing at least one of the plurality of data objects, displaying simultaneously on a second portion of the display screen metadata related to the subset of the plurality of data objects and indicia relating the metadata of the subset of the plurality of data objects to corresponding interactive markers and highlighting and displaying metadata for a second subset in response to a second selection of a second interactive marker representing a different one of the plurality of data objects.

Such techniques assist in identifying themes and provide visual cues to facilitate effective browsing and assist in drawing connections between documents that may initially seem unrelated. The visualization further allows a user to retrieve the information within a data object. The interactive network allows exploration from the scale of the entire network to the scale of an individual node.

In another embodiment, organizing the plurality of data objects includes constructing feature vectors from the plurality of data objects, creating a proximity metric from the feature vectors, identifying links between the data objects by projecting the data base and proximities onto a network and mapping data objects onto a lower dimensional shape using multivariate statistical techniques such that similar objects are in closer proximity than dissimilar objects. Such a technique provides, in addition to term frequency inverse document frequency (TF-IDF) analysis, a wide variety of text based analytic metrics in order to visualize the relationships between documents and a variety of proximity metrics to produce visualizations of other types of documents and data objects.

In a particular embodiment of a method for displaying a plurality of links connecting pairs of the interactive markers, each displayed link indicates the organization of the plurality of data objects and relationships between pairs of the plurality of data objects.

Still other embodiments include computerized devices, configured to process all the method operations disclosed herein as embodiments of the invention. In such embodiments, the computerized devices include a memory system, a processor, communications interface in an interconnection mechanism connecting these components. The memory system is encoded with a process that provides organization and display of a plurality of data objects on a display screen, as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing organization and display of a plurality of data objects on a display screen as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), hard disk or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers or on one computer alone.

Still other arrangements of embodiments of the invention that are disclosed herein include a server system connected to a network capable of performing the method embodiment steps and operations summarized above and disclosed in detail below. More generally, a server may be one of a number of computer devices that together in a distributed fashion perform the method embodiment steps, including servers, embedded systems, personal computers, and mobile devices such as handheld computers, smart phones, and other convergent mobile devices such as iPods and iPads.

It is understood, that the embodiments of the invention can be embodied strictly as a software program, as software and hardware, or as hardware and/or circuitry alone, such as within a data communications device. Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a diagram of an initial display page displaying a list of documents to be selected according to embodiments herein.

FIG. 9 is an exemplary document selected interactively from the display of FIG. 8; and FIGS. 10-11 are flowcharts illustrating an example processes supporting organization, display and navigation according to embodiments herein.

DETAILED DESCRIPTION

Embodiments of the presently described method and apparatus for dynamic information visualization of data sets process sets of data objects which include but are not limited to text, images, sounds, videos. Metrics are applied to the data sets to determine relatedness or similarity (e.g., proximity in a feature vector space of a data object with each of the others in the set). If the metric does not already exist, it may be created by identifying a vector of attributes (or equivalently a feature vector) for each of the objects. The attribute vectors can then be compared for similarity, and a distance is determined in vector space to find which data objects are most similar. Forms of relatedness other than similarity may be used in the construction of the visualization.

The data objects are visualized as a network, where similar data objects are represented by nodes that are relatively closer in proximity. Given a threshold of similarity, links can also be displayed. Each element of the data set is referred to as a data object and is represented as a node. The proximity between two node representations illustrates how similar two data objects are, and a link connects the nodes if the similarity of two data objects is above a chosen threshold. The proximity metric and threshold are both adjustable. The resulting network, or a preexisting network is mapped onto a low dimensional space (e.g., a two dimensional space) that can be rendered on a computer display in which each node is displayed as an interactive marker on a display screen and each link between two nodes is displayed as a line connecting the two representative interactive markers.

Specifically, for the case of a network constructed from a metric, the feature vectors for the set of data objects of the database are used to evaluate the similarity of each of the data objects with one another. This evaluation is used to generate an embedding into the visualization using multivariate techniques so that similar objects tend to be in closer proximity than dissimilar objects. The resulting visualizations can be adjusted by altering the metric and threshold used to create the network.

Figure 1:
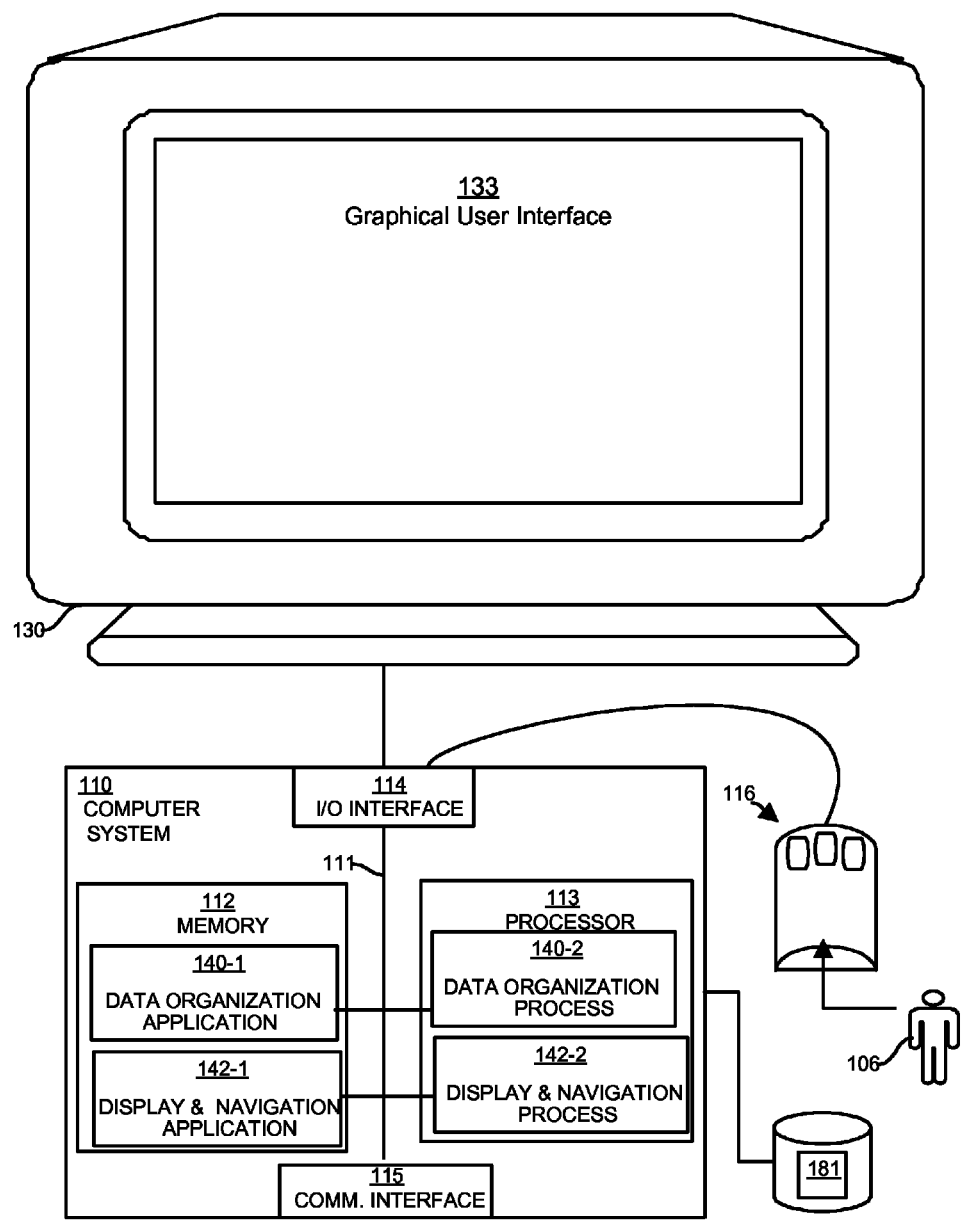
FIG. 1 is a block diagram illustrating an exemplary architecture of a computer system in a computer/network environment according to embodiments herein.

FIG. 1 is an exemplary block diagram illustrating an architecture of a data organization computer system 110 (also referred to as computer system 110) that executes, runs, interprets, operates or otherwise performs data organization process 140-2 (e.g. an executing version of a data organization application 140-1) and a display and navigation process 142-2 (e.g. an executing version of a display and navigation application 142-1) as controlled or configured by user 106 according to embodiments herein.

Note that the computer system 110 may be any type of computerized device such as a personal computer, a client computer system, workstation, portable computing device, console, laptop, netbook, television set-top box, camera, camcorder, network terminal, embedded processor, etc. This list is not exhaustive and is provided as an example of different possible embodiments. In addition to a single computer embodiment, computer system 110 can include any number of computer systems in a network environment to carry the embodiments as described herein. Thus, those skilled in the art will understand that the computer system 110 can include other processes and/or software and hardware components, such as an operating system that controls allocation and use of hardware resources, or multiple processors.

As shown in the present example, the computer system 110 includes an interconnection mechanism 111 such as a data bus, motherboard or other circuitry that couples a memory system 112, a processor 113, an input/output interface 114, and a display 130. Repository 181 can optionally be used for storing documents and content both before and after processing. If so configured, the display can be used to present a graphical user interface of the dynamic information visualization system 110 to user 106. An input device 116 (e.g., one or more user/developer controlled devices such as a keyboard, mouse, touch pad, touch sensitive screen, devices without keypads, speech input etc.) couples to the computer system 110 and processor 113 through an input/output (I/O) interface 114. The computer system 110 can be a client system and/or a server system. As mentioned above, depending on the embodiment, the display and navigation application 142-1 and/or the display and navigation process 142-2 can be distributed and executed in multiple nodes in a computer network environment, executed as a web application or performed locally on a single computer.

During operation of the computer system 110, the processor 113 accesses the memory system 112 via the interconnect 111 in order to launch, run, execute, interpret or otherwise perform the logic instructions of the display and navigation application 142-1. Execution of the display and navigation application 142-1 in this manner produces the display and navigation process 140-2. In other words, the display and navigation process 1422 represents one or more portions or runtime instances of the display and navigation application 142-1 (or the entire display and navigation application 142-1) performing or executing within or upon the processor 113 in the computerized system 110 at runtime.

The display and navigation application 142-1 may be stored on a computer readable medium (such as a floppy disk), hard disk, and electronic, magnetic, optical, or other computer readable medium. It is understood that embodiments and techniques discussed herein are well suited for other applications as well. Those skilled in the art will understand that the computer system 110 may include other processes and/or software and hardware components, such as an operating system. Display 130 need not be coupled directly to computer system 110. For example, the display and navigation application 142-1 can be executed on a remotely accessible computerized device via the communication interface 115. The display 130 presents a rendered graphical user interface 133 that provides a display of data objects in a network. The display and navigator 142 presents dynamic information visualization in response to navigation commands.

Note that the following discussion provides a basic embodiment indicating how to carry out functionality associated with the display and navigator 142 as discussed above and below. However, it should be noted that the actual configuration for carrying out the display and navigator 142 could vary depending on a respective application.

FIGS. 2-9 illustrate exemplary displays presenting information providing dynamic visualization resulting from user navigation of detailed information for one exemplary set of documents. The processes of organization of data objects, interactive visualization and display of a document network is described in further detail below in conjunction with flowcharts in FIGS. 10 and 11. One particular application of the dynamic information visualization system 110 is document based searches. In order to make a document base easier to explore, it is helpful to organize the documents and make this organization facilitate access to the database. Organization of data objects, as detailed below, provides structure to the document base in a way that improves navigation to particular documents by revealing patterns within and among documents. Once the documents are organized, the graphical user interface 133 enables exploration to provide insights through interaction with the information in the network.

The data network can be visualized interactively using the graphical user interface 133 to navigate the network using techniques including zooming, scrolling and panning Individual nodes can be clicked or moused over to highlight the nodes and to obtain further information about a selected data object. Network exploration can occur at multiple scale factors, allowing both local and global navigation with additional metadata displayed along side the network display. Local views are facilitated by zooming in to an area of interest in the network display.

By way of a non-limiting example, FIG. 2 shows an initial display page 200 displaying a partial list 202 including the first 16 of 127 documents to be visualized in a network display. Here, each of the documents is further divided into sub-documents or sections. In this example, the network is displayed at a scale such that the nodes of the network are sub-documents, here, a total of 423 subdocuments. The techniques described below produce a document network of the data objects within a dataset alongside a display of metadata including detailed information for a selected data object. The nodes can be clicked to reveal details of the represented data object. The network can be navigated interactively to visualize the relationships among individual nodes.

Figure 3:
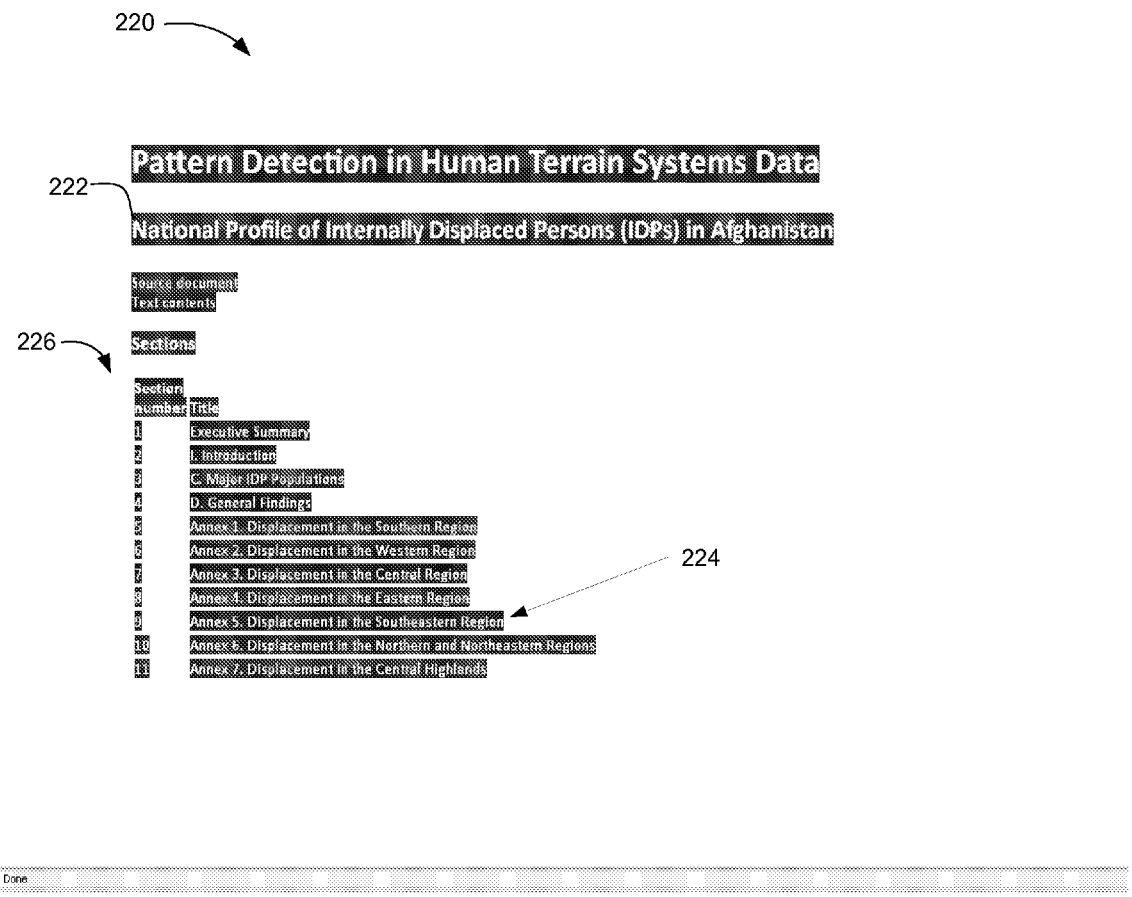
FIG. 3 is a diagram of a display of a list of sub-documents following the selection of a document on the display page of FIG. 2, according to embodiments herein.

In this example, the user selects, for example by clicking with a mouse or other pointing device, on the document number two 204 in the list, 'National Profile of Internally Displaced Persons (IDPs) in Afghanistan,' to display the corresponding sub-documents as shown in FIG. 3. The display screen 220, as shown in FIG. 3, lists the eleven sub-documents which comprise the 'National Profile of Internally Displaced Persons (IDPs) in Afghanistan' document.

Data objects can be selected in multiple ways. A set of selection techniques includes, but is not limited to, visual selection, search term selection, and algorithmic search selection. Data objects may be visually selected using a pointing device such as a mouse click, or touch input to a touch sensitive device. The simultaneous selection of multiple data objects may be achieved by distinguished clicking, such as by holding down a control key while clicking Alternatively, data objects may be selected by specifying at least one identifying term or attribute, for example in a search term query, which may result in selection of an individual or multiple data objects. Alternatively, data objects may be selected by algorithmic selection, which includes the use of search by generalized regular expressions or other logic driven, or programmable, search interface, which may result in selection of an individual or multiple data objects. In response to the selection of individual or multiple data objects, the markers representing these data objects may be altered in color, shape, size or other means to distinguish them visually from the non-selected data object markers.

Next the user clicks on the ninth sub-document 224, 'Annex 5: Displacement in the Southeastern Region.' After this selection, the set of subdocuments is retrieved from a database or calculated in real time. The number of subdocuments in the set is controlled by user adjustable parameters. This selection action initiates a display of a document network 242 and related subset of subdocuments on a second portion of the display screen 244 shown in FIG. 4. The nodes of document network 242 which represent data objects, here subdocuments, are indicated by interactive markers 246a-246n (collectively referred to as interactive markers 246). Optional links 248a-248m indicate the organization of the plurality of data objects and relationships between pairs of the plurality of data objects. The selected data object clicked is highlighted in the document network 242. In this case it is the 'National Profile of Internally Displaced Persons (IDPs) in Afghanistan Section 9: Annex 5: Displacement in the Southeastern Region.'

The indicia representing nodes, here displayed as dots in the network display, represent data objects, or groups of data objects, and more generally may be displayed as markers of various types, to distinguish among corresponding data objects of various types or for visual aesthetics. The markers can be displayed simultaneously or at different times. The indicia representing connections between pairs of data objects, here displayed as line segments can also be illustrated by other display elements including, but not limited to, curves or arcs, dashed or dotted line segments, curves, or arcs, connecting the interactive markers that represent the data objects. Multiple types of markers can be used for distinct types of relationships which can be displayed simultaneously or at different times. For an asymmetric or directed relationship, the line segment may include an arrow, or other indicia such as shading or coloring, indicating the directionality.

Any type of network can be used in this visualization process, including but not limited to, social connections of friends, family and contacts, internet social groups, correlated stock prices in finance, gene interactions, genotypic and phenotypic relationships, food webs, transportation routes, genealogical trees, hyperlinked documents within Wikipedia, academic papers related by common citation, academic papers related by co-authors, semantic web, actor co-occurrence within movies, metabolic pathways, disease spread, countries related by product exports, internet web pages related by links, neuronal interactions, social communications by e-mails, text messages, mobile phone calls, mobile phone, virus spread, human mobility, protein interactions, institutional organization, military organization, functional organization with biological cells, communication infrastructure, and product construction processes.

The selected 'current node' represented by interactive marker 250 represents data object is subdocument 224. The document network 242 includes a proximity mapping based on similarity between the documents or subdocuments. The closest neighboring subdocuments are represented with interactive markers 246 shown on the display screen with a unique indicia which in one embodiment is a unique color. In this embodiment, neighboring subdocuments which are close, but a bit further than the closest nodes are optionally represented by a second different color. Here, close and far refer to a relevance score which is listed alongside the network and which is higher for documents that are more similar. The subdocument titles (and other metadata related to the data objects), the relevance score and indicia 256 and 258 relating the metadata of the subset of the plurality of data objects to corresponding interactive markers 246 are displayed on the second portion of the display screen 244. By looking at the related documents list in the second portion of the display screen 244 and the document network 242, it can be determined that the subset of documents (also referred to as a cluster or network module) is related to displaced persons, and the sections of the document are clustered together in cluster 254.

Figure 4:
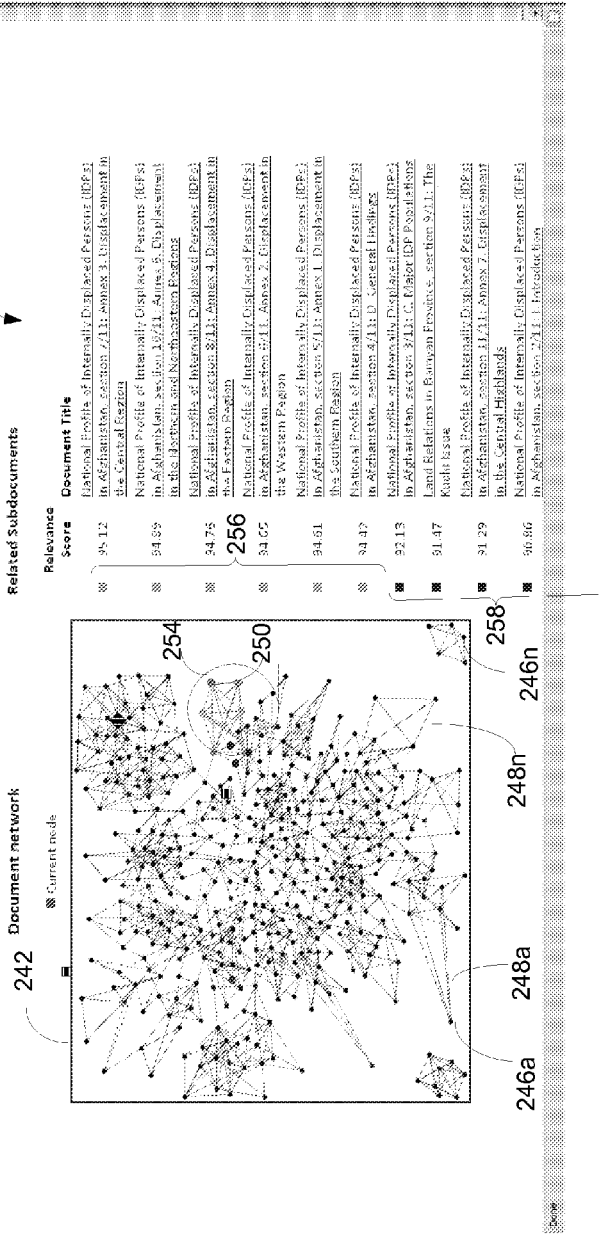
FIG. 4 is a diagram of a display of a document network and metadata related to a subset of subdocuments following the selection of a sub-document on the display page of FIG. 3 according to embodiments herein.
Figure 5:
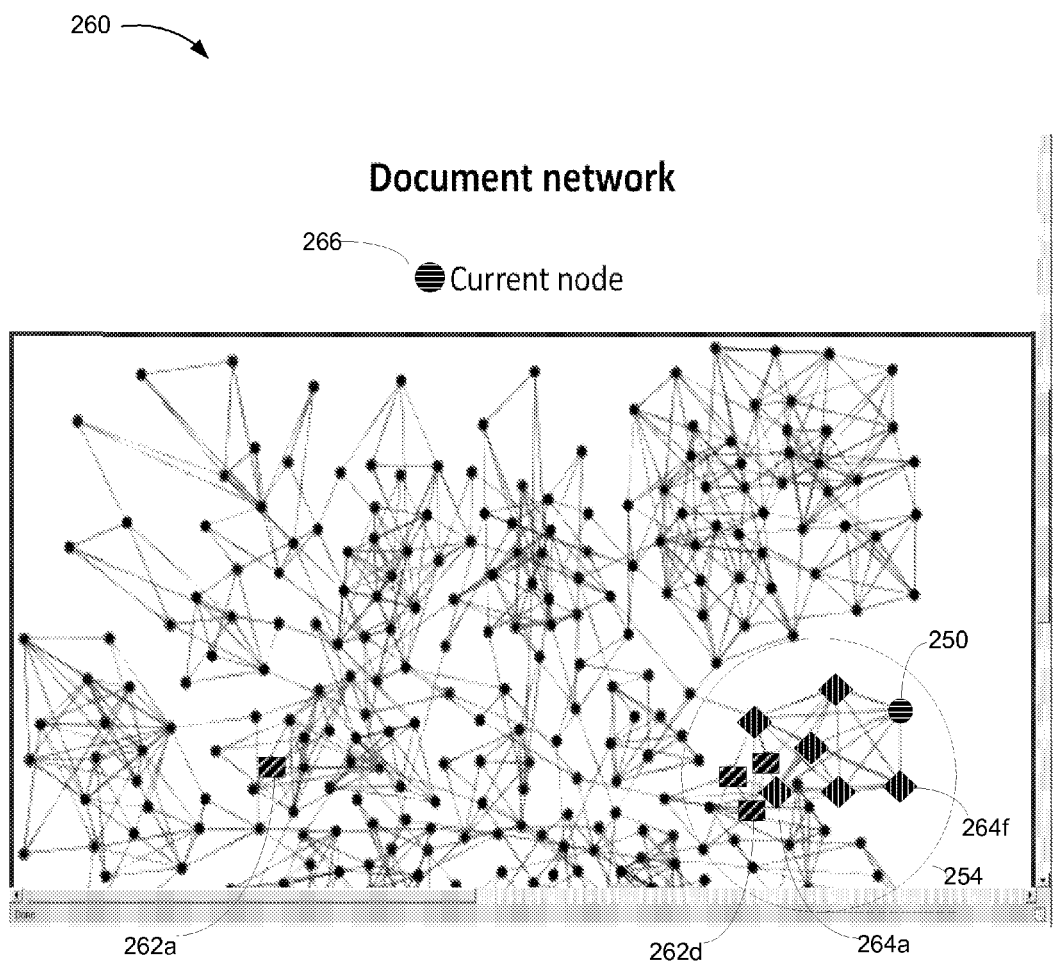
FIG. 5 is a diagram of a display of a zoomed in view of the document network of FIG. 3 displaying the selected node and nodes in a selected subset, according to embodiments herein.

FIG. 5 illustrates a zoomed in view 260 of the document network 242 providing a local view of a portion of the document network 242. The document network 260 shows the highlighted nodes and the neighboring nodes which form the network cluster 254 (also referred to as a network module). Closely related data objects represented by interactive markers 262a-262d correspond to metadata 258 in the second portion of the display screen 244 (FIG. 4). More closely related data objects represented by interactive markers 264a-264f correspond to metadata 256 in the second portion of the display screen 244 (FIG. 4). The interactive marker 250 represents the selected node/data object, here 'Annex 5: Displacement in the Southeastern Region.' For larger networks, the user can zoom out and the system 110 provides a display where several nodes are grouped and displayed as a single entity.

Figure 6:
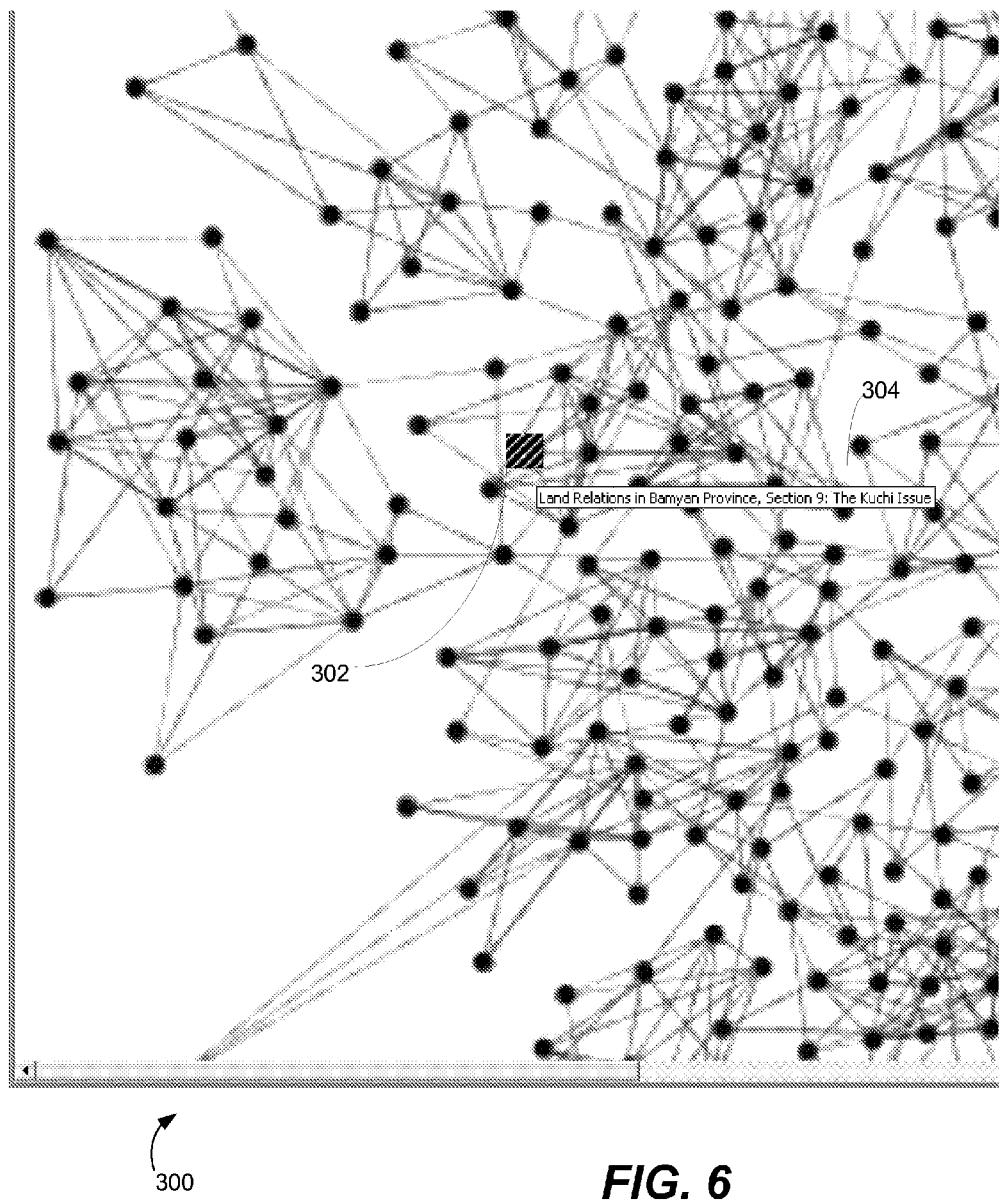
FIG. 6 is a diagram of a display of a document network after zooming in and selecting a node, according to embodiments herein.
Figure 7:
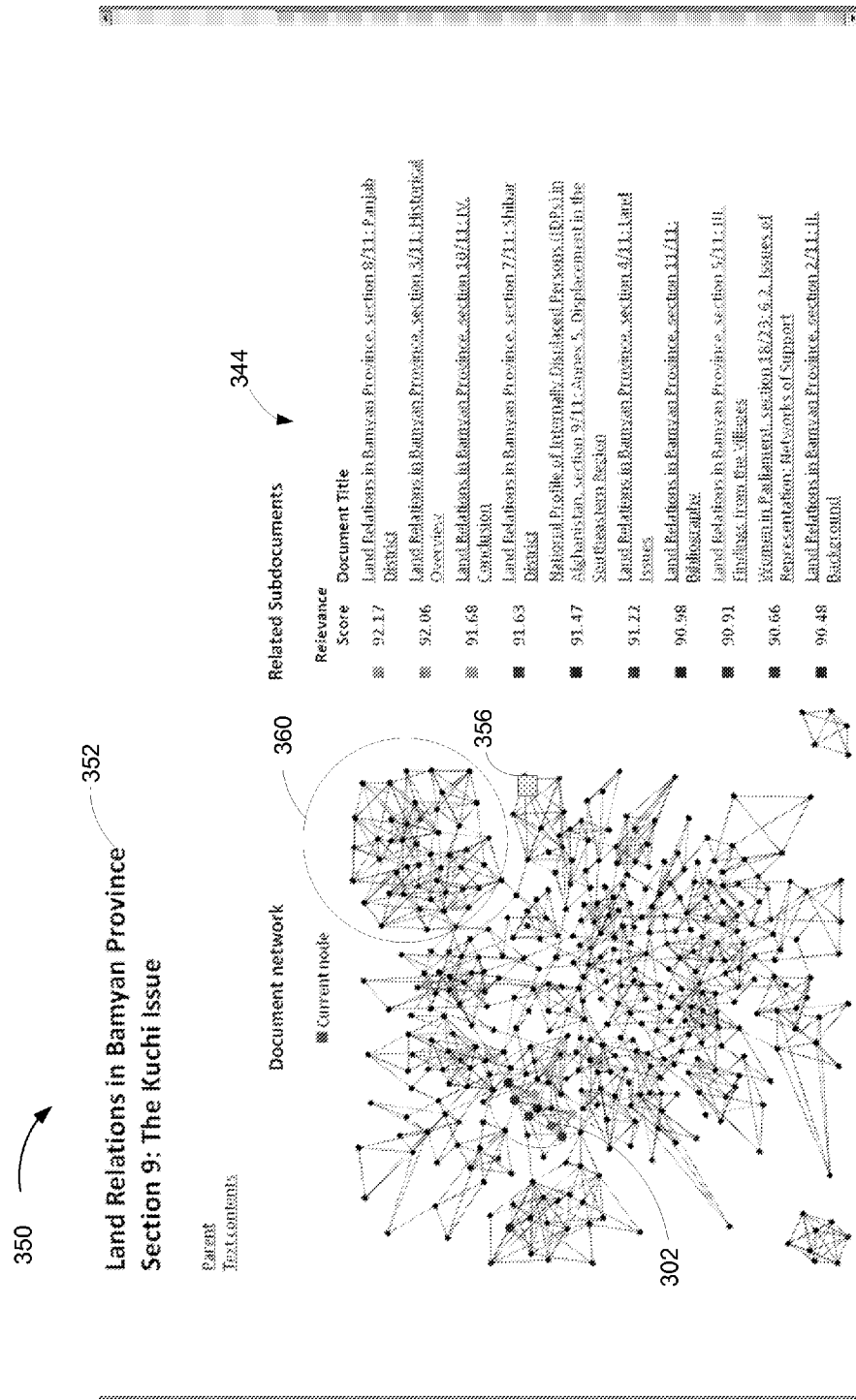
FIG. 7 is a diagram of a display of a document network and metadata related to a subset of subdocuments according to embodiments herein.

FIG. 6, shows a partial zoomed in view 300 of the document network 242 including interactive marker which is a neighbor of the selected node, but is located closer to the center of the document network 242 than the selected node as represented by interactive marker 250. In response to selecting, for example by "mousing over" an interactive marker 302, the system 110 displays an indication of the corresponding subdocument, here as a popup box 304. Clicking on interactive marker 302 selects 'Land Relations in Bamyan Province Section 9: The Kuchi Issue,' and the system 110 displays the document network 350 as shown in FIG. 7 with a new list of the neighboring nodes of the newly selected current node displayed on a second portion of the display screen 344. Interactive node 356 is highlighted with indicia to indicate that it represents the previously selected node.

Figure 8:
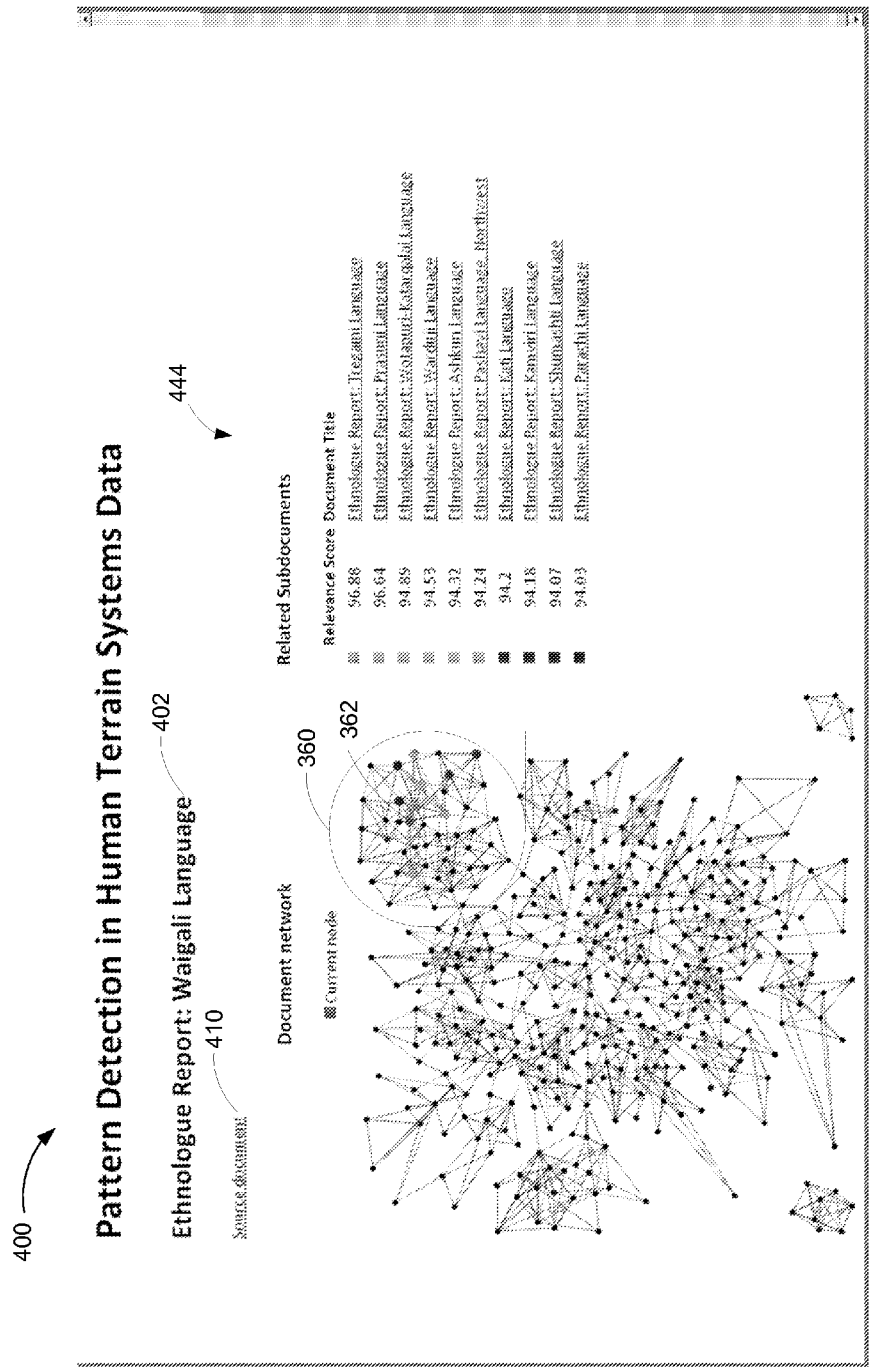
FIG. 8 is a diagram of a display of a document network and metadata related to a subset of subdocuments according to embodiments herein.

Using the document network display 350 as shown in FIG. 7, the user can explore themes relating a cluster of documents. Here the user can determine that the theme relating subdocuments in cluster 360 is languages by clicking on a node 362 in cluster 360. This results in the document network display 400 as shown in FIG. 8. After clicking on the node an updated list of the related subset of subdocuments is displayed on a second portion of the display screen 444. The display includes a graphical interface selection element 410 labeled 'source document'. Clicking on element 410 reveals the contents of the subdocument which is displayed as shown in FIG. 9.

Figure 10:
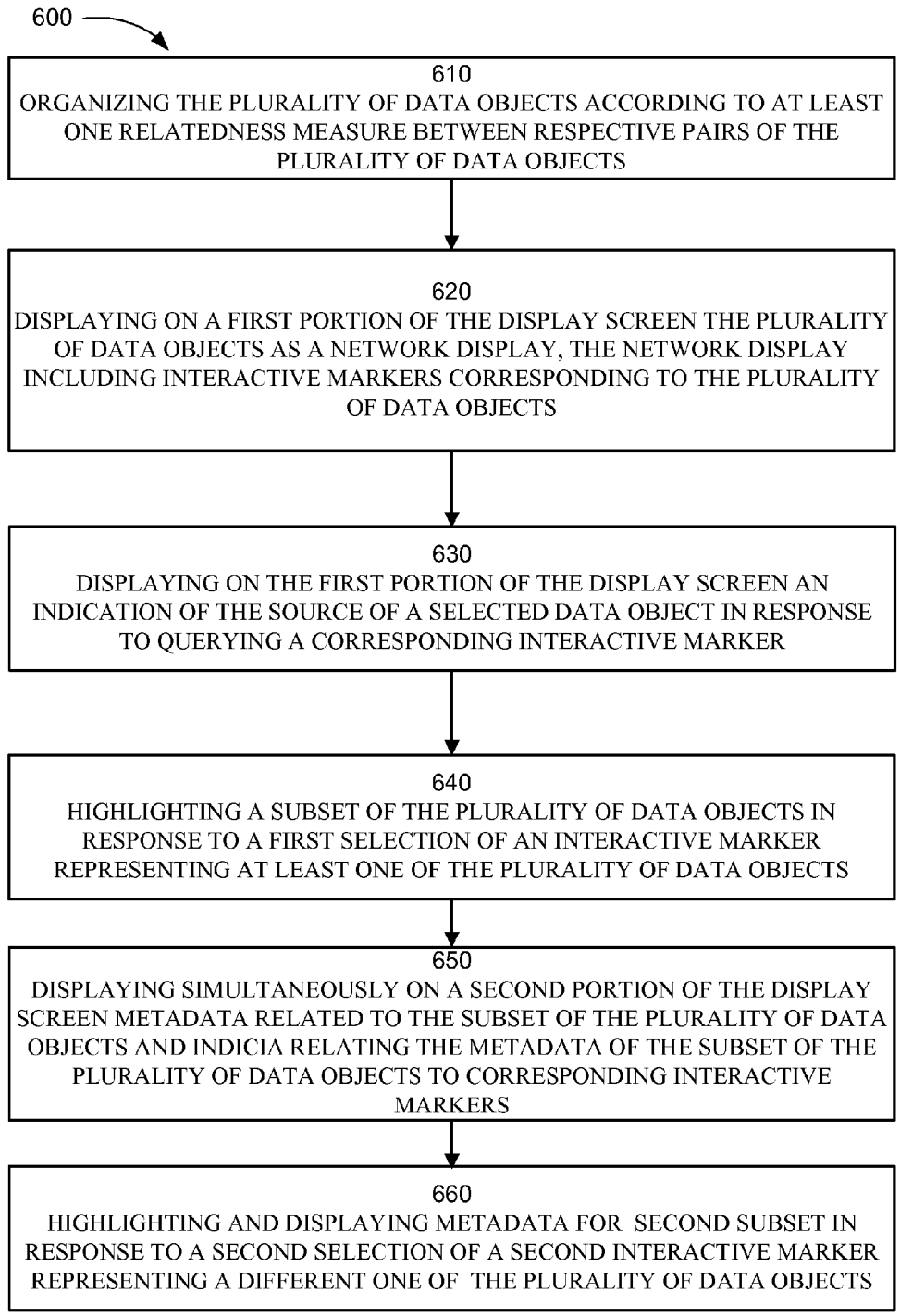

Functionality supported by computer system 110 and, more particularly, functionality associated with data organizer 140 and display and navigator 142 will now be discussed via flowcharts in FIG. 10 and FIG. 11. For purposes of the following discussion, the display and navigator 142 operating on the computing device processes input to navigate through the data objects and the network displays. Flow diagrams of particular embodiments of the presently disclosed methods are depicted in FIGS. 10 and 11. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 10, a method 600 of organizing and displaying a plurality of data objects on a display screen is shown. In the following description a set of documents is used to provide data objects. It is understood that other types of information can be the source of the data objects. Method 600 begins with processing block 602 which discloses organizing the plurality of data objects according to at least one relatedness measure between respective pairs of the plurality of data objects.

There are many features which can be customized in the given document visualization process. The parameters and form of the distance metric can be changed to produce a different distance metric. There are a wide range of possible distance metrics, which allow for a wide range of correlations between documents in a document base. The transformation from the distance value to the score can be further customized to include values within any given range, and different scales of the reported values. The nearest neighbors computation includes parameters which can be adjusted to change how many neighbors are selected with the scoring. In the undirected graph, the thickness can be made more pronounced, and the node colors can be altered or varied. The visualized graph can also be adjusted to display directionality of neighbors. The list of nearest neighbor details next to the graph can also be extended to display documents which link to a particular target subdocument as well.

The techniques described herein can be used for any type of text document, including books, newspaper articles, patent documents, or research papers. The text is statistically analyzed and the documents are organized by similar term and phrase frequencies. An emergent property is that when the user observes the network broadly, the documents are clustered based on content. The user can observe properties of individual documents, groups of documents, and the entire document set without having to read the documents. This is particularly useful for large document databases. Looking at the network of documents as a whole, themes and the distribution of topics become evident. The exploration of large document databases is possible through the interactive interface. A particular node, or a few nodes, can be highlighted to display further information of the selected node or nodes.

Processing block 620 states displaying on a first portion of the display screen, the plurality of data objects as a network display, the network display including interactive markers corresponding to the plurality of data objects. The graphical user interface 133 includes interactive components that facilitate interaction by allowing adjustments of feature vectors or metrics for network construction, including redisplay.

Processing block 630 recites displaying on the first portion of the display screen an indication of the source of a selected data object in response to querying a corresponding interactive marker. Processing block 640 discloses highlighting a subset of the plurality of data objects in response to a first selection of an interactive marker representing at least one of the plurality of data objects.

Processing continues with processing block 650 which discloses displaying simultaneously on a second portion of the display screen metadata related to the subset of the plurality of data objects and indicia relating the metadata of the subset of the plurality of data objects to corresponding interactive markers. Processing block 660 recites highlighting and displaying metadata for a second subset in response to a second selection of a second interactive marker representing a different one of the plurality of data objects.

Referring now to FIG. 11, a method 700 of organizing and displaying a plurality of data objects is described in more detail. A document base is selected which includes a number of documents. The text from the documents is extracted, and the documents are split into subdocuments based on sub headers or topic shifts in each document. For each subdocument, the text segmented by whitespace and any characters and punctuation that are not text strings are removed.

Processing block 710, discloses constructing feature vectors from the plurality of data objects. The technique uses a collection of objects and a network representation. The nodes can represent a particular object, or they can represent properties within the object, or among multiple objects. If there is no network representation, but there is a proximity metric, the metric can be used to construct the network using feature vectors. If there is no proximity metric, the metric can be created using feature vectors of the given objects. There are many ways to create feature vectors of a given object. One method is to create the feature vectors from the weight or frequency of characteristics shared within a collection of objects. In the example described above in FIGS. 2-9, the feature vectors were created using the frequency and weighting of occurrences of single words, word pairs, and word triples. Each of these words or word combination is a symbol which occurs within a collection of documents, and can be used to construct the feature vectors. The feature vectors are then used to determine the proximity between documents as described above.

The data elements in the database do not have to be text format. Any data type upon which there exists a metric for relatedness can be visualized as a network using our process. The network can be used to identify patterns in the data, or search for specific data. For example, the data could be a set of images or a set of sounds. Each node represents the image or the sound, and the links between two nodes represent a similarity that is above a threshold of the similarity determined by the metric. For sounds, the metric on two sounds could be the similarity of the harmonic content given by the Fourier transform of the two sounds. For images, the metric on two images could be the similarity of the images in the frequency domain given by, for example, the Fourier transform of the two images, or the metric could be similarity based in a color space. For example, a set of images can be analyzed for the amounts of different colors, and the similarity of these amounts between different images is the metric.

In one embodiment where document and subdocuments are the data objects, a document database is selected which includes a number of documents. The text from the documents is extracted, and the documents are split into subdocuments based on sub headers or topic shifts in each document. For each subdocument, the text segmented by whitespace and any characters and punctuation that are not text strings are removed. Lists of single, pairs and triples of words are formed. Each single, double and triple list of words is referred to as a term. A frequency count is made over the documents of the single words, and any high frequency single words that are common words such as "the", "and", "or", etc. are removed from the single word list.

Terms are counted over the sets of documents. If a term does not occur in a specified number of documents, here at least six documents, it is removed. A matrix is constructed of subdocuments along the columns and the term frequencies along the rows. The total frequency of terms is calculated in each document, and the document is removed if this sum is less than five terms. Each column in the matrix is a vector, which is a list of frequencies for terms in the particular subdocument. For each term in a subdocument, the term frequency is weighted by dividing the frequency of the term in the subdocument with the product of the frequency of the terms in a subdocument and the frequency of the term in the documents. This is a term frequency inverse document frequency (TF-IDF) calculation which produces a TF-IDF matrix whose columns are the TF-IDF vectors for each of the subdocuments. Each subdocument can be represented by this vector, which provides the surface analysis of term similarity between the subdocument and all others.

While TF-IDF is a possible way to analyze the data, there are a variety of methods which can be used along with a metric to construct a network. The techniques described herein focus on the flexible ability to produce visualization. These techniques also provide visualizations of many data types, allowing both global and local exploration, and simultaneous display of detailed metadata information.

It is noted, that the use of symbols within a document is not the only way to construct feature vectors. Instead, data on the interactions between objects could be used to construct feature vectors, which can then be used with the metric to create the network. The feature vectors are particularly useful if there is no predefined proximity, and creating the feature vectors is particularly useful if there are no predefined characteristics which can be compared for similarity using the proximity metric.

Processing block 712 recites that data objects can be split to any scale of sub-objects for which feature vectors are created, and that the scale refers to the size of the components of the data objects. There are many sources of possible additional data that can be used for the purpose of determining data object proximity. For example, processing block 714 states that metric and features vectors are determined from crowd sourced (i.e., "crowd" and "outsourcing") data, where crowd sourced data refers to information obtained from groups of individuals to be analyzed for purposes of creating the network. Examples of crowd sourced data are internet tags or comments on web pages, images, or film. The crowd sourced data is used to determine proximity of objects within a collection, which can then be visualized on a network.

Processing block 720 discloses creating proximity metrics from the feature vectors. The distance between every pair of vectors is found using a distance metric. In one embodiment, the distance metric can be calculated as follows: for each vector, the unit vector is computed, and one minus the difference squared is calculated. A higher score signifies a closer proximity, and a stronger similarity.

The relationships between elements need not be metric based, they can be determined by other measures. For example, with respect to proteins, whether or not proteins bind can be defined as a metric. Emails exchanges and social contacts are not determined by metrics, but they can still be visualized using networks. Alternatively, the presence or absence of an e-mail exchange or a social contact can define the metric.

Processing block 730 recites identifying links between the data objects by projecting the data base and proximities onto a network. The nearest neighbors are computed by calculating a minimum count of neighbors, a maximum count, and a score threshold. If none of the neighbors are above the threshold, neighbors are chosen with scores closest to the threshold to fulfill the minimum count. If many neighbors have scores above the threshold, the highest scoring neighbors are chosen up to the maximum count. Each of the subdocuments has outgoing links which point to the nearest neighbor subdocuments.

Processing block 740 discloses mapping data objects onto a lower dimensional shape using proximities determined from multivariate statistical techniques such that similar objects are in closer proximity than dissimilar objects. The networks can be visualized by clustering data by their similarity and mapping the resulting relationships onto a shape that is mapped onto the network display. The feature vectors of the clustered data are mapped onto a lower dimensional space (typically two dimensions, but also possibly one to four dimensions) and thus visualized as a network on an interactive computer display.

Processing block 750 states displaying a plurality of links connecting pairs of the interactive markers, each link indicating the organization of the plurality of data objects and relationships between pairs of the plurality of data objects. The visualized graph is an undirected network, where bidirectional links are emphasized by displaying a thicker link width in one embodiment. The visualized network is more selective and includes fewer links than the nearest neighbors computed above making the graph more readable. The graph can be visualized as a network on a website using a browser or with a standalone visualization application. Clicking on a node retrieves the nearest neighbors of that node, which is displayed alongside the network visualization. Included in the detailed information display is a list of the neighboring subdocument titles and their scores. Clicking a title on this list will make that title the selected node in the network. The node that is selected is, for example displayed as a red interactive marker. The neighboring nodes are displayed as green interactive markers, and the neighboring, nodes whose links are not visualized, are displayed as blue interactive markers. It should be noted, that the global display of the information on the network, as well as details on a particular data object are displayed simultaneously. The source document can be retrieved through a web interface or a local or remote database and rendered as text. Processing block 752 Recites displaying links further comprises displaying links as a function of a predetermined threshold of an organizational metric.

In certain embodiments, clicking on the marker representing a link between two data objects displays additional information detailing how these two nodes are related. For the specific example of text analysis based similarity, the display indicates the most recurring terms that appear in both documents. More generally, the measure of similarity or specific relatedness property underlying the existence of the link may be indicated. This information about the nature of the link enables the user to evaluate if the similarity is significant to the user.

One application using techniques of methods 600 and 700 described above in FIGS. 10 and 11 is to organize and display data objects from a document base of news articles from a newspaper. The news articles comprise the document base organized as data objects. The documents are linked by metrics described above. Each node in the network is a news article, and links are drawn between news articles that have a similarity above the predetermined threshold. When a user selects a node, the title of the corresponding article is displayed next to the network, as well as a list of the most similar articles (i.e., the node neighbors). The node neighbors, in one embodiment, are colored green, and the target node is colored red. Any of the other nodes as represented by the corresponding interactive marker can be clicked to make it the target node. The user can zoom in or out of the network and pan from side to side. When a mouse pointer is positioned over an interactive marker (representing a node), a title of the document represented by the node is displayed. This embodiment can be extended to include articles from multiple newspapers. Thus, the system 110 produces a network visualization of the full document base of one or more newpaper archives. In this embodiment, the data set can be open and growing, thus data objects can be added over time.

Another embodiment illustrates a variety of methods for visualizing a particular dataset representing movies. Using the data provided in a movie database, movies can be visualized by process 600, using for example, actor co-occurrence, similarity of description of the movies, or by similarity of directors and lead actors. Another embodiment uses two different proximity metrics to produce two networks. The two networks can be displayed simultaneously side by side to illustrate the current selected document, neighbors, and links in two unique spaces determined by the different proximity metrics. In yet another embodiment, the data objects are already organized by a particular metric. This metric is used to produce the network and the visualization process would provide a method to observe clusters and patterns and navigate through the information by zooming, panning, or node-clicking The embodiments of the invention can be implemented as software, hardware, or a combination. For example, the software can be implemented on a computer, and the network can be navigated with a mouse. The software can also be implemented on a device with a touch screen to allow for navigation, zooming, and panning by touching the visualized network. Another embodiment of the visualization process is to create a software application within which one can drop in documents, and then choose a metric. The application will create and visualize the interactive network. The metric can be changed and the network will automatically be reconstructed for visualization and navigation.

Displaying the plurality of data objects as a network display can include dynamically updating the network display in response an underlying change in the plurality of data objects. The network display can also have additional features such as displaying dynamical movement in response to pulling on a node, as if the network is composed of springs, or other faux physical dynamical process. Such interaction enables the user to better visualize the structure of the network by seeing which nodes oscillate together and how they are clustered as groups. It is another way of providing information about the structure of the network and thus the relationships among data objects. The network can display growth to progressively show more of the network. These dynamics may reflect the incorporation of additional data objects through some criterion which could be their creation over time, or other criteria such as proximity to a specific node with growth showing the progressively larger parts of the network. The selection of nodes can also undergo dynamical change as in a progressive dynamical expansion of the selected group, corresponding to a wave of change through the network. These dynamical processes are only examples as many possible types dynamics on a network that can be incorporated in the visualization.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation. References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a computer network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, or a DVD-ROM, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method for organizing and displaying a plurality of data objects including information on a display screen, the method comprising:
    organizing the plurality of data objects according to at least one relatedness measure between respective pairs of the plurality of data objects;
    displaying on a first portion of the display screen, the plurality of data objects as a network display, the network display including interactive markers corresponding to the plurality of data objects;
    displaying on the first portion of the display screen an indication of a source of a selected data object in response to querying a corresponding interactive marker;
    highlighting a subset of the plurality of data objects in response to a first selection of an interactive marker representing at least one of the plurality of data objects;
    displaying simultaneously, on a second portion of the display screen, a subset of information included in at least one data object in the subset of the plurality of data objects and indicia relating the information included in at least one data object in the subset of the plurality of data objects to corresponding interactive markers;
    highlighting and displaying a second subset of the information included in at least one data object in a second subset of the plurality of data objects in response to a second selection of a second interactive marker representing a different one of the plurality of data objects;
    constructing feature vectors from the plurality of data objects;
    creating a proximity metric from the feature vectors;
    clustering the data objects by projecting the data base and proximities onto a network using multivariate statistical techniques such that similar objects are in closer proximity than dissimilar objects;
    mapping clustered data objects onto a lower dimensional shape; and
    wherein the data objects are split to any scale of sub objects for which feature vectors are created, and wherein scale refers to the size of components of the data objects.

2. The method of claim 1 further comprising displaying additional information about a relationship between a selected pair of nodes in response to a user selection of a corresponding link between the selected pair of nodes.

3. The method of claim 1, wherein a proximity of a pair of interactive markers on the display screen is a function of a similarity between the corresponding pair of data objects.

4. The method of claim 1, wherein the relatedness measure comprises a plurality of links between data objects according to a network description.

5. The method of claim 1, wherein the data objects comprise at least one of
    text data;
    multimedia data;
    image data; and
    audio data.

6. The method of claim 1, wherein data objects are text data documents and the network is a document network.

7. The method of claim 1, wherein the selected subset of the plurality of data objects in response to the first selection of an interactive marker includes a predetermined number of closest neighbors to the first selection of the interactive marker representing the at least one of the plurality of data objects.

8. The method of claim 1, wherein the subset of information included in at least one data object in the subset of the plurality of data objects in the second portion of the display screen includes a title of one of the selected subset of the plurality of data objects in response to the first selection of an interactive marker.

9. The method of claim 1 wherein organizing the plurality of data objects comprises:
    identifying links between the data objects; and
    mapping data objects onto a lower dimensional shape using multivariate statistical techniques such that similar objects are in closer proximity than dissimilar objects.

10. The method of claim 1 wherein the metric and features vectors are determined from crowd sourced data wherein crowd sourced data refers to information obtained from groups of individuals to be analyzed for purposes of creating the network.

11. The method of claim 1, wherein displaying the plurality of data objects as a network display further comprises dynamically updating the network display in response an underlying change in the plurality of data objects.

12. The method of claim 1 further comprising selecting at least one data object by specifying a term in a search term query.

13. The method of claim 1 wherein the metric and features vectors are determined from a term frequency inverse document frequency (TF-IDF) calculation.

14. The method of claim 1 further comprising highlighting nodes and neighboring nodes corresponding to the plurality of data objects which form a network cluster, wherein a subset of closely related data objects are represented by a first plurality of interactive markers corresponding to the subset of information included in at least one data object in the subset of the plurality of data objects in the second portion of the display screen and a different subset of more closely related data objects are represented by a second plurality of interactive markers corresponding to a second plurality of a different subset of information included in at least one data object in a different subset of the plurality of data objects in the second portion of the display screen having a higher relevance score than a first subset of closely related data objects.

15. The method of claim 1 further comprising displaying dynamical movement of the network in response to receiving an indication of a user simulating pulling on a node.

16. A non-transitory computer readable storage device having computer readable code thereon for organizing and displaying a plurality of data objects including information on a display screen, the non-transitory computer readable storage device including instructions in which a computer system performs operations comprising:

organizing the plurality of data objects according to at least one relatedness measure between respective pairs of the plurality of data objects;

displaying on a first portion of the display screen, the plurality of data objects as a network display, the network display including interactive markers corresponding to the plurality of data objects;

displaying on the first portion of the display screen an indication of source of a selected data object in response to querying a corresponding interactive marker;

highlighting a subset of the plurality of data objects in response to a first selection of an interactive marker representing at least one of the plurality of data objects;

displaying simultaneously, on a second portion of the display screen, a subset of information included in at least one data object in the subset of the plurality of data objects and indicia relating the subset of information included in at least one data object in the subset of the plurality of data objects to corresponding interactive markers;

highlighting and displaying a second subset of the information included in at least one data object in a second subset of the plurality of data objects in response to a second selection of a second interactive marker representing a different one of the plurality of data objects;

constructing feature vectors from the plurality of data objects;

creating a proximity metric from the feature vectors;

clustering the data objects by projecting the data base and proximities onto a network using multivariate statistical techniques such that similar objects are in closer proximity than dissimilar object; and mapping clustered data objects onto a lower dimensional shape; and wherein the data objects are split to any scale of sub objects for which feature vectors are created, and wherein scale refers to the size of components of the data objects.

17. The non-transitory computer readable storage device of claim 16 further comprising instructions for performing operations comprising displaying a plurality of links connecting pairs of the interactive markers, each link indicating the organization of the plurality of data objects and relationships between pairs of the plurality of data objects.

18. A computer-implemented method for organizing and displaying a plurality of data objects including information on a display screen, the method comprising:

organizing the plurality of data objects according to at least one relatedness measure between respective pairs of the plurality of data objects;

displaying on a first portion of the display screen, the plurality of data objects as a network display, the network display including interactive markers corresponding to the plurality of data objects;

displaying on the first portion of the display screen an indication of a source of a selected data object in response to querying a corresponding interactive marker;

highlighting a subset of the plurality of data objects in response to a first selection of an interactive marker representing at least one of the plurality of data objects;

displaying simultaneously, on a second portion of the display screen, a subset of information included in at least one data object in the subset of the plurality of data objects and indicia relating the information included in at least one data object in the subset of the plurality of data objects to corresponding interactive markers;

highlighting and displaying a second subset of the information included in at least one data object in a second subset of the plurality of data objects in response to a second selection of a second interactive marker representing a different one of the plurality of data objects;

displaying a plurality of links connecting pairs of the interactive markers, each link indicating an organization of the plurality of data objects and relationships between pairs of the plurality of data objects;

wherein displaying links further comprises displaying links as a function of a predetermined threshold of an organizational metric;

wherein the relatedness measure is similarity between the respective pairs of the plurality of data objects; and wherein the network has an adjustable threshold to display links when a degree of similarity is greater than a predetermined threshold.

19. The method of claim 18 further comprising displaying dynamical movement of the network in response to receiving an indication of a user simulating pulling on a node.

20. The method of claim 18 further comprising displaying additional information about a relationship between a selected pair of nodes in response to a user selection of a corresponding link between the selected pair of nodes.

21. The method of claim 18, wherein the relatedness measure comprises a plurality of links between data objects according to a network description.

22. The method of claim 18, wherein the data objects comprise at least one of
text data;
multimedia data;
image data; and
audio data.

23. The method of claim 18, wherein data objects are text data documents and the network is a document network.

24. The method of claim 18, wherein the selected subset of the plurality of data objects in response to the first selection of an interactive marker includes a predetermined number of closest neighbors to the first selection of the interactive marker representing the at least one of the plurality of data objects.

25. The method of claim 18, wherein the subset of information included in at least one data object in the subset of the plurality of data objects in the second portion of the display screen includes a title of one of the selected subset of the plurality of data objects in response to the first selection of an interactive marker.

26. The method of claim 18, wherein displaying the plurality of data objects as a network display further comprises dynamically updating the network display in response an underlying change in the plurality of data objects.

27. The method of claim 18 further comprising selecting at least one data object by specifying a term in a search term query.

28. The method of claim 18 further comprising displaying dynamical movement of the network in response to receiving an indication of a user simulating pulling on a node.

* * * * *